Dec. 4, 1962 F. L. HAAKE 3,066,970
SEPARABLE CONNECTOR
Filed April 5, 1960
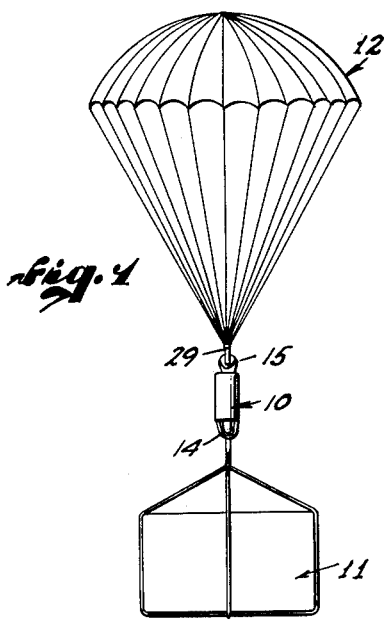
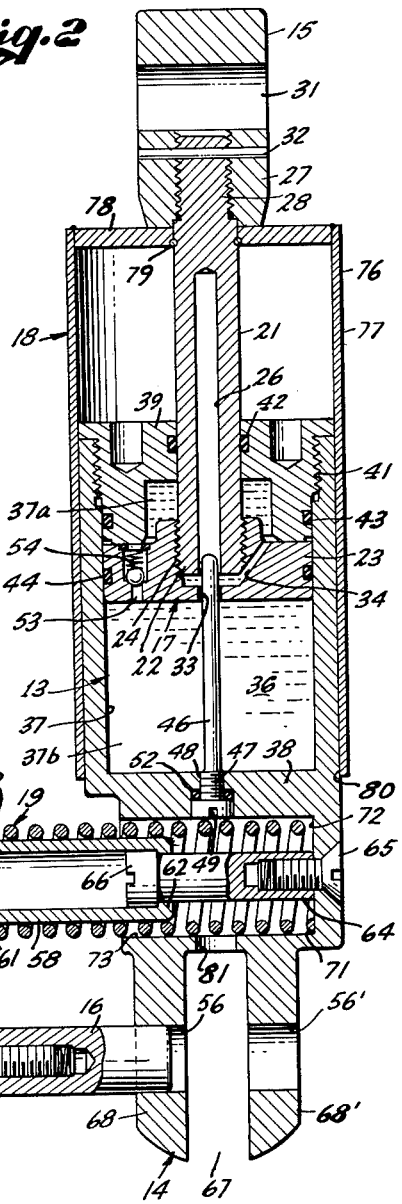
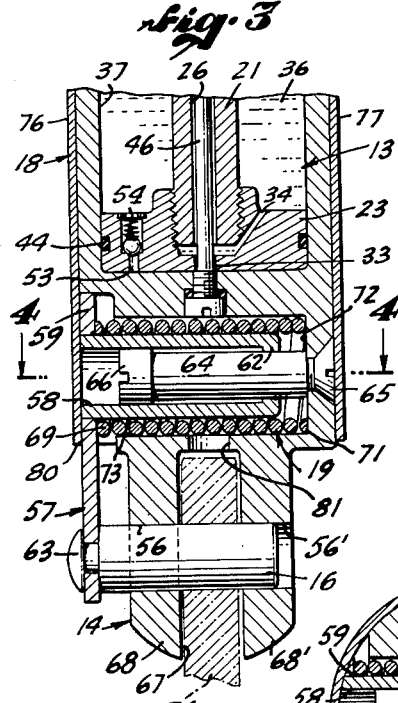
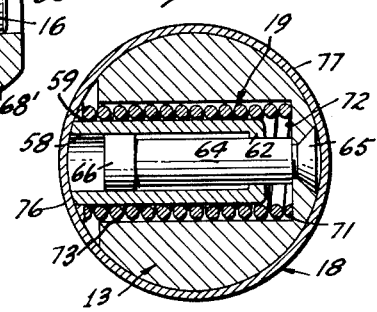
FREDERICK L. HAAKE,
Inventor.
HERZIG & JESSUP,
Attorneys.
By

United States Patent Office 3,066,970
Patented Dec. 4, 1962

3,066,970
SEPARABLE CONNECTOR
Frederick L. Haake, 1519 Little Farms Road,
Oxnard, Calif.
Filed Apr. 5, 1960, Ser. No. 20,064
11 Claims. (Cl. 294—83)

This invention relates to a separable connector and more particularly to a connector device for connecting a pair of objects having opposing pulling forces, or an object having a pulling force in one direction to an object having a resisting pulling force in an opposite direction, for example, for connecting a load to a parachute whereby the parachute is disconnected from the load in response to reduction of the pulling force of the load when it contacts the ground.

This invention provides a new and improved separable connector for connecting a pair of objects having opposite pulling forces in which one of the objects is disconnected from the other in response to reduction of pulling force of one of the objects.

More specifically, although adaptable to other applications, this invention provides a practicable and improved means for connecting a load to a parachute whereby the load is instantly disconnected from the parachute upon contact of the load with the ground to prevent dragging of the load by the parachute after such contact.

This invention is an improvement over my issued patent entitled "Parachute Disconnecting Device," No. 2,284,392 which issued on July 8, 1958. The instant invention provides, among other advantages, improved means for retaining a clevis pin position for supporting the load, improved replaceable means for predetermining the rate of movement of its piston to its cylinder, and means for holding the clevis pin captive to the device after actuation thereof to release the load.

Specifically, this invention provides a new and improved separable connector having a cylinder adapted at one end to slidably receive a clevis pin for supporting a load, piston slidingly fitting in the cylinder and having an end connectable to the parachute and a spring means biasing the clevis pin out of the cylinder end to release the load, the spring means being operative in response to reduction of the pulling force of the load, as upon contact with the ground, to release the clevis pin from the cylinder end to release the load. The piston means includes a sleeve means movable therewith for selectively retaining the clevis pin in a load-supporting position, the sleeve being withdrawn upon relative movement of the piston to the cylinder for releasing the clevis pin for removal from the cylinder end to release the load.

The invention further provides means removably and replaceably mounted in the cylinder and coactive with the piston means for controlling the rate of movement of the piston relative to the cylinder at a predetermined rate to provide a predetermined time interval before release of the clevis pin to avoid premature release thereof.

The invention also provides means for retaining the clevis pin captive relative to the device to prevent loss thereof after actuation thereof to release the load.

When it is desired to lower or drop a load to the ground, from an aircraft, or the like, the load is preferably gently lowered to the ground, as by a parachute, in order that injury from impact is lessened or avoided. Often, however, a relatively fragile load is injured after contact with the ground, by being dragged by the parachute, It is therefore highly desirable that the parachute be immediately disconnected from the load to prevent dragging after the load has reached the ground.

It is therefore an object of this invention to provide a new and improved separable connector between a load and its support, in the form of a parachute, upon a predetermined reduction in the pulling force of the load, to avoid injury to the load, after it has reached the ground, by dragging by the parachute.

It is a further object of this invention to provide a separable connector of the character described which will function after expiration of a predetermined period of time.

It is another object of this invention to provide such a separable connector which is actuated to disconnect the parachute from its load upon contact of the load with the ground.

Yet another object of this invention is to provide a disconnecting means on the device which prevents premature disconnecting of the parachute from its load.

Yet another object of this invention is to provide a new and improved separable connector in which means for predetermining the rate of movement of a piston to its cylinder is easily and readily replaceable by a similar means altering the rate of movement.

Still another object of this invention is to provide a new and improved separable connector of the character described in which means are provided for holding captive parts thereof, after actuation thereof, to prevent loss of the parts.

A further object of this invention is to provide a new and improved separable connector which is economical to manufacture and capable of mass production.

A general object of this invention is to provide a new and improved separable connector which generally overcomes disadvantages of prior devices heretofore intended to accomplish generally similar purposes.

These and other objects of this invention will be more apparent from the following detailed description, drawings, and appended claims.

In the drawings:

FIG. 1 is a schematic side view, in elevation, illustrating the connector means of this invention as applied to connect a load to a parachute;

FIG. 2 is a vertical, cross-sectional view, as taken substantially along the longitudinal center line of the connector device of this invention;

FIG. 3 is a fragmentary, vertical, cross-sectional view, similar to the lower portion of FIG. 2, showing parts thereof in another position; and FIG. 4 is a horizontal, cross-sectional view, taken substantially along the line 4—4 of FIG. 3.

Referring in detail to the drawings, there is shown, by way of illustration but not of limitation, a separable connector designed and constructed in accordance with this invention and generally designated by the numeral 10. The connector 10 is illustrated in FIGURE 1 as connecting a load 11 to a parachute 12 for lowering the load to the ground from an aircraft, or the like, in which the load 11 is disconnected from the parachute 12 upon contact with the ground. It is to be understood, however, that other applications of the connector 10 are practicable, and need not be limited to such use.

The connector 10 generally comprises a cylinder 13 having a bifurcated, apertured, clevis end 14 and supporting a transversely slideable clevis pin 16 for support of the load 11, and a piston means 17 slidingly fitting in the cylinder 13 and having an outer end 15 connectable to the parachute 12. When the load 11 is dropped or ejected from an aircraft and the parachute 12 is opened, the load 11 exerts a downward pulling force on the cylinder 13 whereas the parachute 12 exerts an opposite, upward pulling force on the piston 17 to cause a relative movement between the piston and cylinder. The piston 17 includes means 18 movable therewith for initially enclosing the clevis 16 so as to lock the clevis in a load-supporting position. The means 18 is withdrawn, upon relative movement of the piston to the cylinder, for releasing or unlatching the clevis pin 16 for biasing by a spring means 19 into a load-releasing position, the spring means being operative in response to reduction of pulling force of the load 11 on the clevis pin 16 to position the clevis pin in the load-releasing position.

The piston means 17 includes a piston rod 21 secured at its lower end 22 to an enlarged piston head 23, as by a threaded connection 24, the piston rod having a longitudinal passage 26 communicating with the lower end 22 and an apertured fitting 27 removably secured to the upper end 28 thereof forming the connecting end 15 adapted to be connected to the parachute 12, as by a loop 29 extending through the aperture 31 thereof. A pin 32 is preferably provided to key the enlarged end 27 to the upper end 28 of the piston rod 21 for locking the two together. The enlarged head 23 of the piston 17 includes an aperture 33 aligned with the passage 26 of the piston rod 21 and communicating with a passage 34 of the head 23 permitting a fluid 36 contained within the chamber 37 of the cylinder 13 to communicate between the chamber portion 37a between the piston head 23 and the bottom wall 38 of the chamber 37 and the chamber portion 37b between the piston head 23 and the top wall 39 of the cylinder 13. The top wall 39 is removable, as by a threaded connection 41, for filling of the chamber with the fluid 36 and having a fluid tight relationship by the provision of suitable O-ring packings 42 and 43 sealing the chamber 37 at the threaded connection 41 and around the piston rod 21. A similar O-ring packing 44 is provided circumjacent the piston head 23 to prevent leakage of fluid therearound.

It will now be more clearly understood that as the piston head 23 is moved relative to the cylinder 13, in response to an opposite pulling force thereagainst, fluid within the chamber 37 escapes from one side of the piston to the other as through the communicating aperture 33 and passage 34. The rate of movement of the piston 17 relative to the cylinder 13 is controlled by the provision of a pin 46 removably and replaceably mounted on the cylinder 13 and extending through the aligned aperture 33 and passage 26 to restrict the flow of fluid through the aperture 33, the passage 26 providing a clearance for the pin 46 during the relative movement of the piston to the cylinder.

The pin 46 is an extension of a shank 47 threadingly secured at 48 in the bottom wall 38 of the cylinder 13, a kerf 49 being provided in an enlarged head 51 of the shank 47 to facilitate installation and removal of the pin. The threaded securement 48 is sealed by an O-ring packing 52 surrounding the shank 47. The pin 46 provides a predetermined clearance relative to the aperture 33 whereby the pin may be replaced with a similar one having a different diametrical dimension to provide a different clearance between the pin and the aperture 33 to change the rate of movement between the piston 17 and the cylinder 13. A pin 46 of a smaller diameter provides a larger clearance relative to the aperture 33 to permit an increase of rate of flow of the fluid from one chamber to another to increase the rate of movement of the piston 17 relative to the cylinder 13 whereas, conversely, a pin 46 of a larger diameter results in a decrease of the rate of movement of the piston and cylinder. The rate of movement can be thereby easily and readily adjusted without the necessity of changing the fluid 36 for a fluid having a different viscosity.

A passage 53 having a uni-directional spring-biased check valve 54 is provided in the piston head 23 and communicating between opposite sides of the piston head 23 so that the piston means 17 may be reset within the cylinder 13 to the normal position shown in FIG. 3. The check valve 54 permits flow of the fluid within the chamber 37 in a direction to permit rapid movement of the piston 17 relative to the cylinder 13 to the collapsed position with the head 23 in abutment with the wall 38, but closes the passage 53 in response to relative movement of the piston to the cylinder in the opposite direction.

The clevis pin 16 is slidable in aligned apertures 56 and 56' of the bifurcated end 14 and forms a part of a U-shaped member 57 having limited transverse movement relative to the cylinder 13. The member 57 includes a tubular member 58 forming a leg opposite to the clevis pin 16 and a bight portion 59 connecting the two legs, i.e., the clevis pin 16 and the tubular member 58. The tubular member 58 is preferably secured to the bight portion 59 as by welding 61, or optionally non-permanently secured, and includes an inturned flange 62 at its outer end. The clevis pin 16 is removably secured to the bight 59 as by securement means 63 in the form of a screw or bolt.

The tubular member 58 is slideable on a post 64 removably secured to the cylinder wall 13 as by securement means 65, in the form of a screw or bolt, and includes an enlarged head 66 which is abuttable with the flange 62 to limit outward transverse movement of the U-shaped member relative to the cylinder body 13 and thereby limit the movement of the clevis pin 16 relative to the end 14. The relative movement is predetermined so that the clevis pin 16, in its outermost position illustrated in FIG. 2, is clear of the space 67 between legs 68, 68' of the bifurcated end 14 but is held captive within the aperture 56 of its adjacent leg 68.

The spring means 19 is mounted circumjacent to the tubular member 58 and its support post 644 and has one end 69 bearing against the bight 59 and its opposite end 71 bearing against the bottom 72 of a blind bore 73 extending into the body of the cylinder 13 to bias the U-shaped member 57 transversely and outwardly relative to the body of a cylinder 13 and thereby bias the clevis pin 16 outwardly of the clevis end 14 and clear of the space 67 to disengage a ring or loop 74 securing the load 11 to the device 10.

The means 18 for retaining the clevis pin 16 in a load-supporting position, inserted within the apertures 56, 56' of the clevis end 14, and spanning the space 67, is secured to the piston means 17 and responsive to the relative movement of the piston 17 to the cylinder 13 to release the clevis 16 for bias by the springs 19 into a load-releasing position. The retaining means 18 includes a sleeve member 76 having an annular wall 77 circumjacent to the body of the cylinder 13 and slideable thereon, an end wall 78 clamped between the end 27 and a retaining ring 79 of the piston rod 21, and an open end 80.

The length of the annular wall 77 is proportioned, relative to the cylinder body, so that its lower portion overlies the bight portion 59 of the U-shaped member 57 with the clevis 16 and tubular member 58 extended inwardly of their apertures 56 and 733, respectively, as illustrated in FIG. 3. In response to relative movement of the piston 17 to the cylinder 13, the sleeve 77 is moved to disengage the bight 59 to release the bias of the spring 19.

In operation, the device 10 is secured at its end 15 to the parachute 12 as by the connection of the loop or hook 29 through the aperture 31 and at its lower end 14 to the load 11 by the positioning of the loop 74 within the space 67 and inward extension of the U-shaped member 57 to engage the clevis pin 16 through the loop 74, the spring means 19 being thereby compressed to exert a biasing force against the bight 59. The piston 17 is extended to the bottom of a cylinder 13, into the position of FIG. 3, to draw the annular wall 77 to overlie the bight 59 and retain the clevis pin 16 within the loop 74.

When the combination of the device 10, load 11 and parachute 12 is dropped or ejected and the parachute 12 is opened, the load 11 exerts a downward pulling force against the cylinder 13 whereas the parachute 12 offers a resistant, upward pulling force on the piston means 17 to cause the piston 17 to move upwardly, relative to the cylinder 13, towards the removable wall 39 of the cylinder. The fluid 36 within the chamber 37 is caused to flow through the aperture 33 restricted by the pin 46 and the passage 34 at a predetermined rate to allow relative movement of the piston and the cylinder at a predetermined rate. As the piston 17 is moved, the sleeve means 18 is likewise moved to disengage the U-shaped member 57 to release the bias of a spring means 19 thereagainst to thereby bias the clevis pin 16 outwardly of the aperture 56' and space 67.

The load 11, however, exerting a downward pulling force against the pin 16, resists movement of the pin 16 outwardly of the aligned apertures 56 until the load 11 contacts the ground whereupon the pulling force of the load is substantially reduced. The reduction of the pulling force of the load releases its frictional engagement from the pin 16 to release the bias of the spring means 19 to urge the U-shaped member 57 transversely to pull the pin 16 in a position clearing the space 67 whereupon the ring 74 is disconnected from the connector 10. The parachute 12 is then free to be flown about by the wind, if any, without causing any injury to the load 11. To increase frictional engagement of the ring 74 with the clevis pin 16, one or both may be roughened, by knurling or the like.

To adjust the rate of movement of the piston relative to the cylinder 13, the restricting pin 46 may be removed and another pin 46 of suitable size and providing a suitable clearance with the aperture 33 is replaced. The pin is removable as through an aperture 81 aligned with the pin, after the post 64 is removed.

While I have herein shown and described my invention in what I have conceived to be the most practical and preferred embodiments, it is recognized that departures may be made therefrom within the scope of my invention, which is not be limited to the details disclosed herein but is to be accorded the full scope of the claims so as to embrace any and all equivalent devices and methods.

What I claim as new and desire to secure by Letters Patent is:

1. A device for separably connecting a parachute and its load, comprising: a cylinder having a clevis end; piston means slidingly fitting said cylinder and having an end connectable to said parachute; pin means insertable into said clevis end for supporting said load; sleeve means circumjacent to said cylinder and secured to said piston means for movement therewith and for retaining said pin means in said clevis end; and spring means biasing the said pin means out of said clevis end to release said load, said sleeve means being withdrawn upon relative movement of said piston means to said cylinder for releasing said pin means from said clevis end and said spring means being operative in response to reduction of pulling force of said load on said pin means to release said pin means from said clevis end.

2. A device for separably connecting a parachute and its load, comprising: a cylinder having a clevis end; piston means slidingly fitting said cylinder and having an end connectable to said parachute; pin means insertable into said clevis end for supporting said load; sleeve means circumjacent to said cylinder and secured to said piston means for movement therewith and for retaining said pin means in said clevis end; spring means biasing said pin means out of said clevis end to release said load, said sleeve being withdrawn upon relative movement of said piston means to said cylinder for releasing said pin means from said clevis end; and means removably mounted in said cylinder and coactive with said piston means so as to control the rate of movement of said piston means relative to said cylinder at a predetermined rate, said spring means being operative in response to reduction of pulling force of said load on said pin means to release said pin means from said clevis end.

3. A device for separably connecting a parachute and its load, comprising: a cylinder having a clevis end; a piston slidingly fitting said cylinder and having an end connectable to said parachute; pin means insertable into said clevis end for supporting said load; sleeve means circumjacent to said cylinder and secured to said piston means for movement therewith and for retaining said pin means in said clevis end; spring means biasing said pin means out of said clevis end to release said load; and means replaceably mounted in said cylinder and coactive with said piston means so as to adjustably control the rate of movement of said piston means relative to said cylinder at a predetermined rate, said sleeve being withdrawn upon relative movement of said piston means and said cylinder for releasing said pin means from said clevis end and said spring means being operative in response to reduction of pulling force of said load on said pin means to release said pin means from said clevis end.

4. A device for separably connecting a parachute and its load, comprising: a cylinder having a clevis end; piston means slidingly fitting said cylinder and having an end connectable to said parachute; pin means insertable into said clevis end for supporting said load; sleeve means circumjacent to said cylinder and secured to said piston means for movement therewith and for retaining said pin means in said clevis end; spring means biasing said pin means out of said clevis end to release said load; and means for holding said pin means captive relative to said cylinder when said pin means is released from said clevis end, said sleeve being withdrawn upon relative movement of said piston means to said cylinder for releasing said pin means from said clevis end and said spring means being operative in response to reduction of pulling force of said load on said pin means to release said pin means from said clevis end.

5. A device, as defined in claim 2, including means for holding said pin means captive relative to said cylinder when said pin means is released from said clevis end.

6. A device, as defined in claim 3, including means for holding said pin means captive relative to said cylinder when said pin means is released from said clevis end.

7. A separable connector comprising: a body defining a cylinder and having an apertured end; a U-shaped member having one leg insertable into said apertured end for supporting a load having a first pulling force, another leg slidable in said body, and a bight portion connecting said legs; sleeve means circumjacent to said body and secured to said piston means for movement therewith and coactive with said bight portion for retaining said one leg in said apertured end; and spring means biasing said leg so as to bias said one leg out of said apertured end for releasing said load having a first pulling force, said sleeve being withdrawn upon relative movement of said piston means to said cylinder for releasing said one leg from said apertured end and said spring means being operative in response to reduction of said first pulling force of said load on said first leg to release said first leg from said clevis end.

8. A separable connector comprising: a body defining a cylinder and having an apertured end; a U-shaped member having one leg insertable into said apertured end for supporting a load having a first pulling force, another leg slidable in said body, and a bight portion connecting said legs; sleeve means circumjacent to said body and secured to said piston means for movement therewith and coactive with said bight portion for retaining said one leg in said apertured end; means removably mounted in said cylinder and coactive with said piston so as to control the rate of movement of said piston relative to said cylinder at a predetermined rate; and spring means biasing said legs so as to bias said one leg outwardly of said apertured end for releasing said load having a first pulling force; said sleeve being withdrawn upon relative movement of said piston means to said cylinder for releasing said one leg from said apertured end and said spring means being operative in response to reduction of said first pulling force of said load on said first leg to release said first leg from said clevis end.

9. A separable connector, as defined in claim 7, including means replaceably mounted in said cylinder and coactive with said piston means so as to adjustably control the rate of movement of said piston means relative to said cylinder at a predetermined rate.

10. A connector, as defined in claim 7, including means for holding said first leg captive relative to said cylinder when said first leg is released from said clevis end.

11. A connector, as defined in claim 8, including means for holding said first leg captive relative to said cylinder when said first leg is released from said clevis end.

References Cited in the file of this patent

UNITED STATES PATENTS

| | | |
|---|---|---|
| 2,400,165 | Porter | May 14, 1946 |
| 2,483,044 | Gongwer | Sept. 27, 1949 |
| 2,534,704 | Frieder et al. | Dec. 19, 1950 |
| 2,682,425 | Staats | June 29, 1954 |
| 2,842,392 | Haake | July 8, 1958 |